US009473461B2

(12) United States Patent
Asaithambi et al.

(10) Patent No.: US 9,473,461 B2
(45) Date of Patent: Oct. 18, 2016

(54) TRANSPARENT TUNNELING ARCHITECTURE FOR A SECURED DATABASE

(71) Applicant: International Business Machines Corporation, Armonk, NY (US)

(72) Inventors: Ganesh B. Asaithambi, Heidelberg (DE); Holger Karn, Aidlingen (DE)

(73) Assignee: International Business Machines Corporation, Armonk, NY (US)

(*) Notice: Subject to any disclaimer, the term of this patent is extended or adjusted under 35 U.S.C. 154(b) by 32 days.

(21) Appl. No.: 14/553,126

(22) Filed: Nov. 25, 2014

(65) Prior Publication Data

US 2016/0149858 A1    May 26, 2016

(51) Int. Cl.
*G06F 9/00* (2006.01)
*H04L 29/06* (2006.01)
*G06F 21/62* (2013.01)

(52) U.S. Cl.
CPC ......... *H04L 63/029* (2013.01); *G06F 21/6227* (2013.01)

(58) Field of Classification Search
CPC .................. H04L 63/0281; H04L 63/0428
USPC .......................................................... 726/12
See application file for complete search history.

(56) References Cited

U.S. PATENT DOCUMENTS

| | | | |
|---|---|---|---|
| 7,640,348 B2 | 12/2009 | Atwal et al. | |
| 7,904,454 B2 | 3/2011 | Raab | |
| 8,166,006 B2 | 4/2012 | Brown et al. | |
| 8,359,641 B2 | 1/2013 | DelRocco et al. | |
| 8,458,783 B2 | 6/2013 | Walters et al. | |
| 2003/0061404 A1 | 3/2003 | Atwal et al. | |
| 2004/0093607 A1* | 5/2004 | Elliott | H04L 67/1097 719/326 |
| 2014/0279929 A1* | 9/2014 | Gupta | G06F 11/1471 707/683 |

OTHER PUBLICATIONS

Oracle Database Java Developer's Guide, Retrieved from Internet Jul. 30, 2014, http://docs.oracle.com/cd/B28359_01/java.111/b31225/chtwelve.htm#, 9 pages.
Ruzhi et al., A Database Security Gateway to the Detection of SQL Attacks, 2010 3rd International Conference on Advanced Computer Theory and Engineering, 978-1-4244-6542-2/ copyright 2010 IEEE, pp. V3-537-540.

* cited by examiner

*Primary Examiner* — Anthony Brown
(74) *Attorney, Agent, or Firm* — Schmeiser, Olsen & Watts, LLP; John Pivnichny

(57) ABSTRACT

A method and associated systems for a transparent tunneling architecture for a secured database. A tunneling driver captures a user's database-access request before it can be blocked by a security gateway. The driver translates the request into a Web-service request, where the requested Web service is implemented by means of classes or objects that correspond to database operations. The request is formatted into a standard database-independent form that the security gateway allows to pass to the database server intact. A Web-service runtime environment interprets the requested Web service, thereby instructing the server-side database-management application to respond to the user's access request. In a reverse procedure, the database's response is translated into a Web-service response to the requested Web service that may similarly tunnel through the security gateway, and that is then translated back into a form that may be properly interpreted by the requesting user's client application.

20 Claims, 3 Drawing Sheets

TRANSPARENT TUNNELING ARCHITECTURE FOR A SECURED DATABASE

TECHNICAL FIELD

The present invention relates to a method of accessing a database that is protected by a security mechanism.

BACKGROUND

Security mechanisms intended to protect data stored in an information repository can sometimes hamper legitimate attempts to access data stored in the repository. A secured database or knowledgebase, for example, may be protected by a security gateway, firewall, or other access-restricting mechanism that constrains access to: only those queries that are submitted by an authorized user or client application; only stored data that is authorized to be accessed by a particular user; or only those queries that satisfy an other security-related condition. Furthermore, such an access-restricting mechanism may for similar reasons bar a legitimate attempt to revise data stored in the repository or to store new data in the repository.

In a typical computing environment, a user communicates with an information repository through an intermediate software module known as a driver. In the most general case, an application that manages an information repository will comprise application-specific drivers that handle each user's data-access requests. In a relational-database platform, for example, each user might query information in the database by means of a client-interface module that implements the query by constructing and transmitting an SQL (Structured Query Language) query to an instance of the relational database manager's driver. The driver would then translate the query language into specific commands that instruct the database manager how to perform the query.

In order to efficiently manage a computing environment, such drivers are generally standardized, such that a query or a write request submitted by a user through a repository driver always delivers a predictable set of instructions to the information repository. Standardization is also highly desirable because it simplifies maintenance and configuration tasks, allowing the repository/driver combination to appear to a user to be a black box that responds in a known, deterministic way to a certain set of instructions, regardless of the repository's underlying architecture or platform.

This simple driver-interface architecture works well in an environment in which a user is allowed essentially unrestricted access to contents of an information repository. But when a security mechanism is interposed between the repository and its users, the security mechanism may interpret the driver's generated instructions as posing a security risk and thus block the instructions from reaching the repository.

In some cases, it may be possible to customize each user's drivers to produce instructions that may be allowed by a security mechanism to reach the repository. Such a customized driver might, for example, provide self-authenticating instructions that tell the security mechanism to allow a query to reach the protected repository. But this approach may be cumbersome to the point of being unworkable in a real-world computing environment. In most cases, users do not have access to driver source code and thus cannot alter the operation or functionality of a standardized driver.

Furthermore, tailoring each user's drivers to interoperate with user-specific combinations of security mechanisms, client applications, and information repositories would eliminate benefits of driver standardization. In many cases, the existence of such customized drivers would create support issues that greatly complicate routine tasks like policy upgrades, platform configuration, application patching, and virtual-machine provisioning. Worse, the customized drivers might have to each be manually rewritten every time a corresponding database application or security gateway undergoes a major upgrade, or a security policy is modified.

There is no solution in the prior art that allows a user of a standard client application to seamlessly and transparently overcome such barriers to database access through a security mechanism.

BRIEF SUMMARY

A first embodiment of the present invention provides a computer system comprising one or more processors, a memory coupled to each of the one or more processors, a computer-readable hardware storage device coupled to the one or more processors, and a complementary pair of tunneling drivers, said storage device containing program code configured to be run by the one or more processors via the memory to implement a method for a transparent tunneling architecture for a secured database, the method comprising:

a first tunneling driver of the complementary pair receiving a database-access request from a user application, wherein the user application and the database communicate through a security gateway that allows only authorized communication with the database;

the first tunneling driver translating the database-access request into a first request for Web services, wherein the first request for Web services is in a form authorized for forwarding by the security gateway to a Web services runtime environment, wherein the Web services runtime environment is configured to respond to a receipt of the first request by generating and sending output to the second tunneling driver of the complementary pair, wherein the output does not have to pass through the security gateway in order to reach the second tunneling driver, wherein a functionality of the Web services requested by the first request comprises a functionality of the requested database access; and wherein the second tunneling driver is configured to, in response to receiving the generated output, communicate to the database instructions identical to those of the access request.

A second embodiment of the present invention provides a method for a transparent tunneling architecture for a secured database, the method comprising:

a first tunneling driver of a complementary pair of tunneling drivers receiving a database-access request from a user application, wherein the user application and the database communicate through a security gateway that allows only authorized communication with the database;

the first tunneling driver translating the database-access request into a first request for Web services, wherein the first request for Web services is in a form authorized for forwarding by the security gateway to a Web services runtime environment, wherein the Web services runtime environment is configured to respond to a receipt of the first request by generating and sending output to the second tunneling driver of the complementary pair, wherein the output does not have to pass through the security gateway in order to reach the second tunneling driver, wherein a functionality of the Web services requested by the first request comprises a functionality of the requested database access; and wherein the second tunneling driver is configured to, in response to receiving the generated output, communicate to the database instructions identical to those of the access request.

A third embodiment of the present invention provides a computer program product, comprising a computer-readable hardware storage device having a computer-readable program code stored therein, said program code configured to be executed by a processor of a computer system to implement a method for a transparent tunneling architecture for a secured database, the method comprising:

a first tunneling driver of the complementary pair receiving a database-access request from a user application, wherein the user application and the database communicate through a security gateway that allows only authorized communication with the database;

the first tunneling driver translating the database-access request into a first request for Web services, wherein the first request for Web services is in a form authorized for forwarding by the security gateway to a Web services runtime environment, wherein the Web services runtime environment is configured to respond to a receipt of the first request by generating and sending output to the second tunneling driver of the complementary pair, wherein the output does not have to pass through the security gateway in order to reach the second tunneling driver, wherein a functionality of the Web services requested by the first request comprises a functionality of the requested database access; and wherein the second tunneling driver is configured to, in response to receiving the generated output, communicate to the database instructions identical to those of the access request.

DETAILED DESCRIPTION

Figure 1:
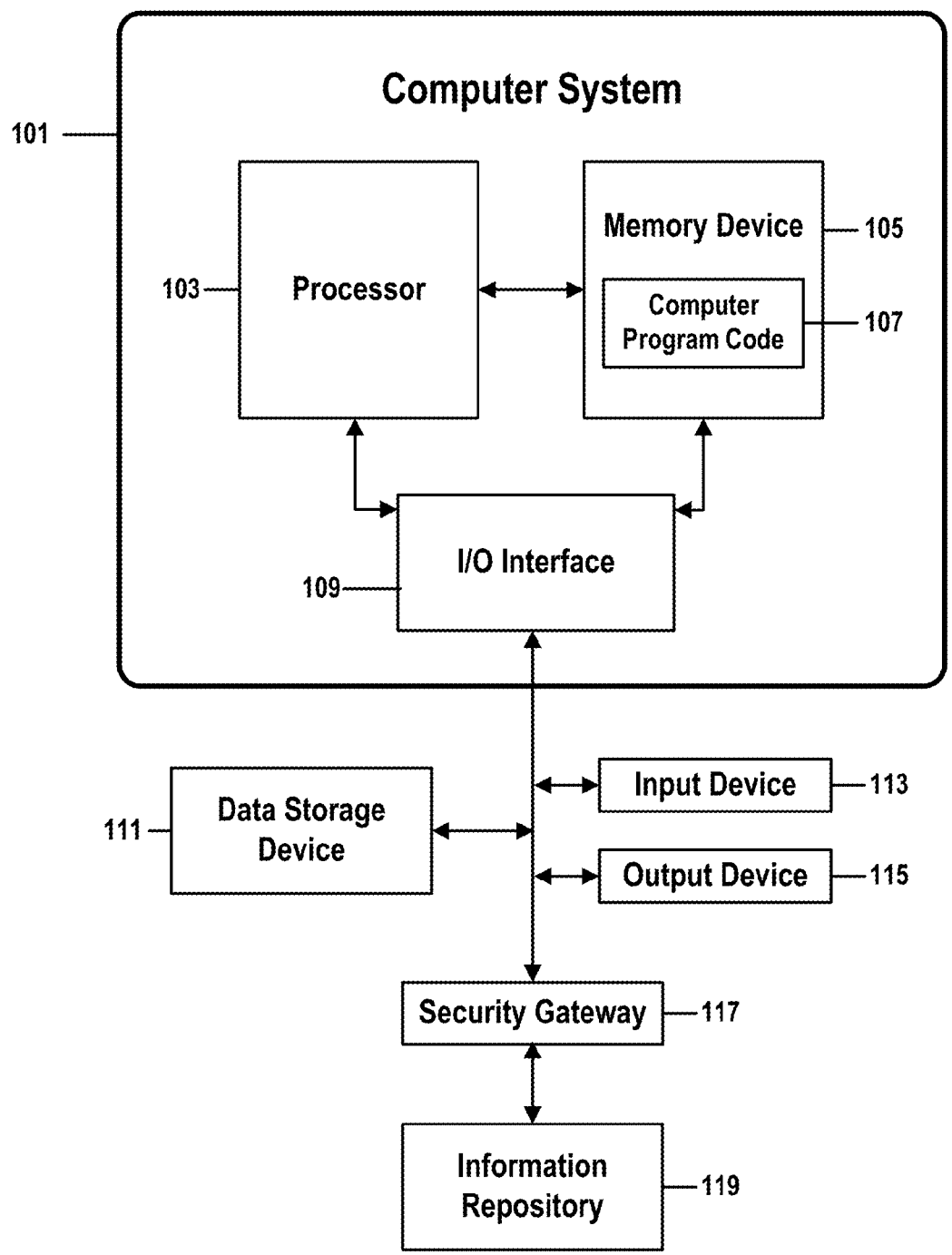
FIG. 1 shows a structure and environment of a computer system and computer program code that may be used to implement a method for a transparent tunneling architecture for a secured database in accordance with embodiments of the present invention.

Embodiments of the present invention may comprise communications with any type of information repository known to those skilled in the art, such as a relational database, a knowledgebase, or any other type of structured or unstructured stored data. Similarly, embodiments may address issues associated with any type of security mechanism known to those skilled in the art, such as a security gateway, a firewall, or a security component of a software application.

In embodiments and examples described in this document, the many types of information repository that may be comprised by an embodiment of the present invention may be referred to simply as a "database." Similarly, the many types of security mechanisms described in the embodiments and examples of this document may be referred to simply as a "security gateway." These simplified references are included solely to make this document more readable and should not be construed to limit any embodiment of this invention to a single type of information repository or security mechanism.

In its simplest form, the present invention permits transparent communications between a user or client application and a secured database, where the secured database is located on a platform that is protected by a security gateway. A technical advantage of the present invention is that the invention allows these transparent communications to be performed by a standardized database driver, without requiring customized drivers to be implemented for each class of user-database transaction.

Such technical advantages accrue when a security gateway regulates network traffic according to criteria programmed into the gateway. Such criteria might, for example, direct the gateway to allow communications only from a trusted source, permit the transfer of data only if that data is not associated with a higher security level than possessed by a requestor ("security classification"), or permit the transfer of data only when a requestor matches a list of allowed requesting organizations (a "release-to classification").

Such technical advantages accrue when a security gateway regulates network traffic according to criteria programmed into the gateway. Such criteria might, for example, direct the gateway to allow communications only from a trusted source, or permit the transfer of data only if that data is not associated with a high-security level.

Such gateways thus prevent many kinds of database interactions if those interactions are initiated by means of standard database drivers typically associated with a database-management application or other information-processing facility associated with a particular information repository. This is true because such drivers are generally intended and designed to facilitate efficient and accurate access to the database, not implement security policies that might be specific to a particular computing environment, business entity, or database configuration.

There is thus a need for a way to ensure consistent and reliable user access to secured databases that may be implemented without requiring custom, implementation-dependent alteration of standard database drivers provided by a database vendor.

The present invention solves this problem by providing a "tunneling" layer of applications-level communications that allows messages exchanged between a user and a database to "tunnel" through a security gateway. In embodiments described herein, this tunneling layer may be implemented as a pair of complementary bidirectional tunneling drivers that translate communications between a user and a database into a form that permits those communications to "tunnel" through a security gateway while the security gateway is still able to apply its security policies. After the tunneling communications pass through the gateway, the tunneling drivers then translate those tunneling communications back to their original form, where they may be received processed normally by a database-management system or by a user's client application.

FIG. 1 shows a structure and environment of a computer system and computer program code that may be used to implement a method for a transparent tunneling architecture for a secured database in accordance with embodiments of the present invention. FIG. 1 refers to objects 101-119.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to, printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for a transparent tunneling architecture for a secured database in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for a transparent tunneling architecture for a secured database.

Any of the components of the present invention could be created, integrated, hosted, maintained, deployed, managed, serviced, supported, etc. by a service provider who offers to facilitate a method for a transparent tunneling architecture for a secured database. Thus the present invention discloses a process for deploying or integrating computing infrastructure, comprising integrating computer-readable code into the computer system 101, wherein the code in combination with the computer system 101 is capable of performing a method for a transparent tunneling architecture for a secured database.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for cross-retail marketing based on analytics of multichannel clickstream data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for cross-retail marketing based on analytics of multichannel clickstream data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Computer system 101 communicates with one or more security gateways 117, which regulate communications between the computer system 101 and information repository 119. As described above, security gateway 117 may comprise a combination of any types of security mechanisms known to those skilled in the art, such as a security gateway, a firewall, or a security component of a software application. Similarly, information repository 119 may comprise a combination of any type of information storage-and-retrieval mechanism known to those skilled in the art, such as a relational database, a knowledgebase, or any other type of structured or a location of unstructured stored data.

In embodiments described here, a user of, or an application running on, computer system 101 may communicate with information repository 119 by passing communications through security gateway 117. As will be described in FIGS. 2 and 3, additional tunneling drivers may be located between the computer 101 and the security gateway 117, and between the security gateway 117 and the information repository 119. These tunneling drivers will permit the computer system 101 to communicate with the information repository 119 regardless of whether the security gateway 117 would normally block certain types of traffic passed between standard drivers associated with information repository 119.

Embodiments of the present invention may be implemented as a method performed by a processor of a computer system, as a computer program product, as a computer system, or as a processor-performed process or service for supporting computer infrastructure.

Figure 2:
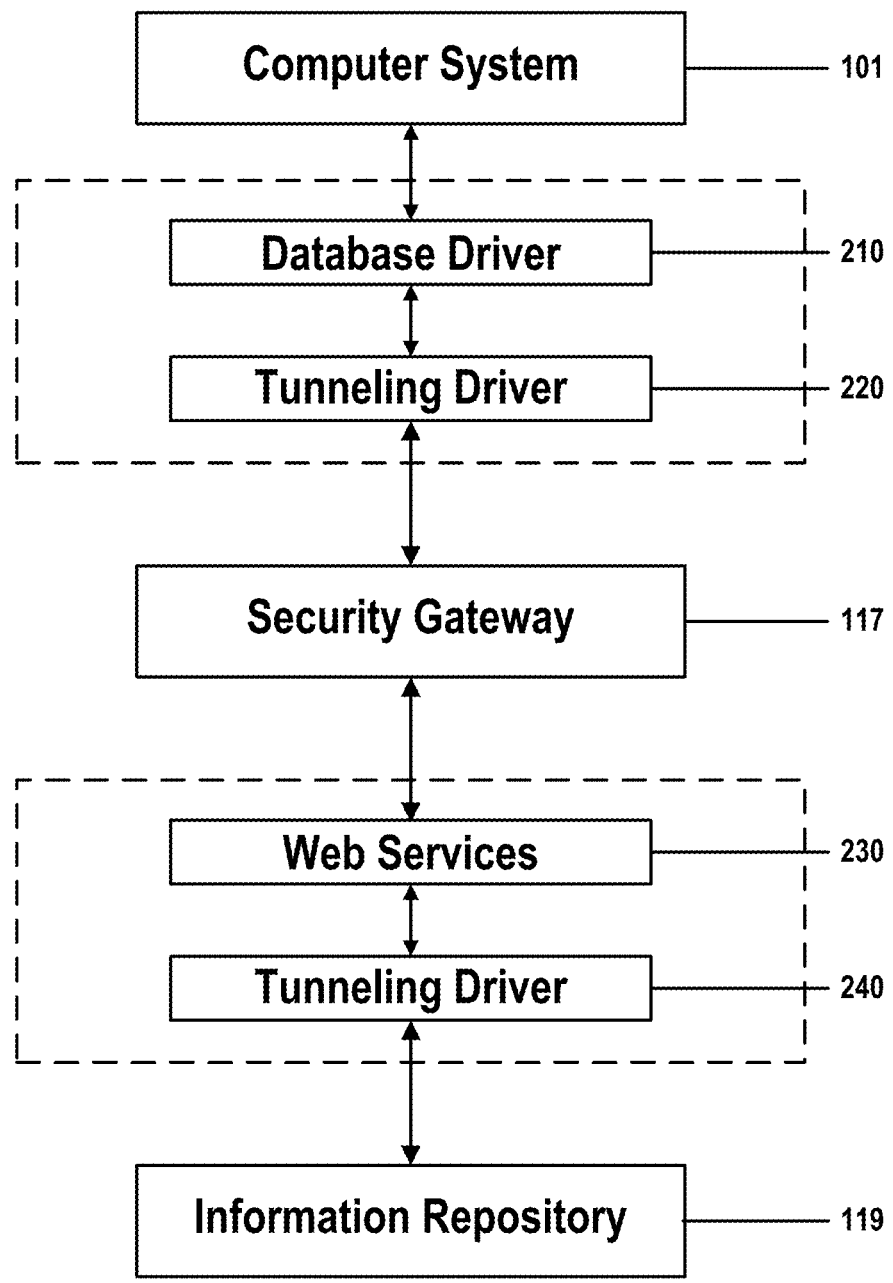
FIG. 2 shows a transparent tunneling architecture for a secured database embodiment of the method of the present invention.

FIG. 2 shows a transparent tunneling architecture for a secured database embodiment of the method of the present invention. FIG. 2 comprises elements identified by reference numbers 210-240 and further comprises elements 101, 117, and 119 of FIG. 1. Items 101, 210, and 220 comprise a client-side computing environment that is separated from server-side items 119, 230, and 240 by security gateway 117.

As in FIG. 1, a user or a user's client application running on computer system 101 attempts to communicate with a database or other information repository 119, where such communications are regulated by a security gateway 117 or other information-regulating mechanism.

In traditional implementations, a user access request is forwarded by a client application to a standardized database driver 210 running on the user's computer system 101. Standardized driver 210 translates the request into a form that may be understood by the database or repository 119. If, for example, the repository 119 is a relational database, driver 210 may translate a user request to search database 119 into a Structured Query Language (SQL) query.

Driver 210 is generally supplied by a vendor of information repository 119 and is thus designed to reliably and consistently translate access requests from users into a form that may be understood by the repository 119; and to reliably and consistently translate a response sent to the user from the repository 119 into a standard form that may be understood by the user's client application.

In embodiments of the present invention, database instructions produced by database driver 210 in response the user query are captured by a tunneling driver 220 before the instructions can reach the security gateway 117. This tunneling driver 220 translates them into a form that is recognized by the security gateway as having priority, or of satisfying an other security-related condition, sufficient to allow the translated instructions to be passed intact through the security gateway 117.

In some embodiments, this translation may comprise translating instructions created by the database driver into calls to a set of Web services. These Web-service requests may identify Web services in such a way that the service requests are allowed through the security gateway 117.

In many cases, such Web services are supported by a security gateway because they allow the gateway to inspect the contents of a service request and respond by performing any necessary data-cleansing, data-removal, or other rule based operations upon the contents. In certain embodiments described in this document, a set of custom Web services might translate database instructions into a format that complies with the common Simple Object Access Protocol (SOAP) for structured information in the implementation of Web services. This approach would allow a compliant security gateway to then inspect the SOAP message, determine its security level and source of origin (e.g. the requestor's organization), and allow it to be delivered or performed. In some implementations, a security gateway may even be designed by default to pass only SOAP-compliant Web-service messages.

In other embodiments, the translation may comprise translating the instructions into a different type of service request, such as a call to a secure Application Program Interface (API). Although examples described herein generally cite steps in which the tunneling driver 220 translates the instructions generated by database driver 210 into Web-service requests, embodiments may comprise an analogous translation step that translates the instructions into any form known to those skilled in the art that is capable of identifying a user's requested operation and that is capable of being properly understood by a security gateway 117.

After passing through the security gateway, the translated instructions are forwarded to a set of Web services 230. These Web services 230 may require a runtime environment in order to become available to the user or to an information repository 119. Such an environment may include, but is not limited to any proprietary or open Web service container, such as the Apache Tomcat open-source application server.

The Web services 230, upon receiving the translated request for services from the tunneling driver 220, as passed through the security gateway 117, will perform the operations identified by the translated request, or will translate the operations identified by the translated request into a form that may be understood by the database or information repository 119, by a second database driver that forward instructions directly to the repository 119, or by a second tunneling driver 240 that translates the output of the Web services 230 into a form that can be understood by the repository 119. In its simplest form, the Web services 230 generate output that the tunneling driver 240 transforms into standard database instructions that may be understood by the information repository 119. In some embodiments, tunneling driver 240 may further comprise the functionality of database driver 210, eliminating the need to retain the database driver 210.

The information repository 119 returns data to the user through a complementary procedure in which the returned data is translated into calls to runtime Web services 230, or to equivalent resources or services; the services 230 produce output that is authorized to pass intact through the security gateway 117; the tunneling driver 220 receives the Web services output and converts it into a standardized form; and the database driver 210 forwards the standardized information to the user's client application. This methodology also insures complete delivery of a message when a security gateway, rather than completely blocking an attempted transmission of information, is designed to instead remove only that part of the information that is prohibited by a security policy.

In some embodiments, either direction of this procedure may assume any of the modular structures described above. Entities on either side of the gateway may comprise different combinations of a database driver, a tunneling driver, and a host server for Web services or other types of services. The overall functionality of this architecture will comprise the operations described in FIGS. 2 and 3, but the structure of the modules that perform these operations may be implementation-dependent. Web services 230, for example, may comprise multiple software services running on multiple servers, and a tunneling driver 210 or 240 may completely replace, and perform the functions of, a standard database driver.

Figure 3:
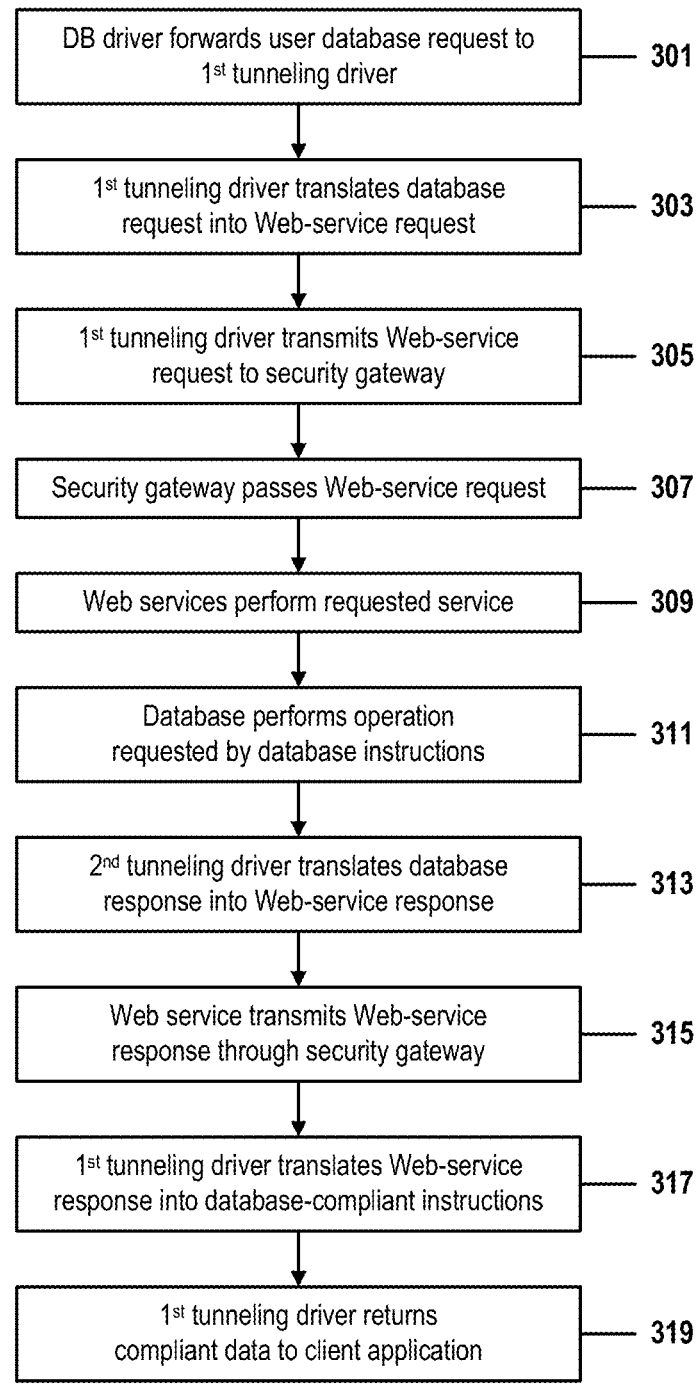
FIG. 3 is a flow chart that illustrates the steps of a method for a transparent tunneling architecture for a secured database in accordance with embodiments of the present invention.

FIG. 3 is a flow chart that illustrates the steps of a method for a transparent tunneling architecture for a secured database in accordance with embodiments of the present invention. FIG. 3 contains steps 301-323 which may be performed by embodiments that incorporate the architecture of FIG. 2.

In step 301, as described in FIG. 2, a user, possibly by means of a client application running on a computer system 101, sends a request to a standardized database driver 210. This request might invoke any function that may be performed by an application that manages a database or other type of information repository. Such a request might, for example, comprise a query, a record deletion, a definition of a key or index, or an update to a stored data element. The request may be in a standardized format that is proprietary to a particular software vendor, platform, or software application, or may comply with open or proprietary conventions or standards.

The database driver 210, in response to receiving the user's request, forwards the request to the information repository 119, which is protected by a security gateway mechanism 119. In embodiments of FIG. 2, however, this forwarded request is intercepted by a first tunneling driver 220, which captures the database driver's output before the output is visible to either the security gateway 117 or the information repository 119.

In some embodiments, this architecture may be simplified by incorporating the functionality of the database driver 210 into the first tunneling driver 220. In implementations in which this incorporation is possible, the combined first tunneling driver 220 will receive the user request directly from the client application.

In such embodiments, the first tunneling driver 220 may be configured to perform all the functions that may be performed by a standardized database driver 210, as well as be able to translate those standardized functions into a form that may be passed through a security gateway 117. Such a translated form may include a set of Web services based on Java classes that correspond to common functions of a database driver, such as connecting to a database, querying a database, and retrieving results from a database. Similar implementations may be based on programming languages, scripts, or platforms other than Java, such as C, C++, or C#.

In step 303, the first tunneling driver 220 (or an integrated driver that combines functionality of the database driver 210 and the first tunneling driver 220) translates the user-request instructions, as formatted by the database driver 210 in step 301, from their original database-specific form into a set of function calls or service requests that may pass intact through the security gateway 117. In an example described below, such a set of service requests might consist of SOAP-compliant Web-service requests, which are likely to be supported by a security gateway 117. Such structured SOAP requests might invoke Web services that emulate functionality equivalent or analogous to that of the original user request received in step 301.

In step 305, the first tunneling driver 220 transmits its translated instructions to the security gateway 117. As described above, in some embodiments, these translated instructions may comprise a set of SOAP-compliant requests for the performance of Web services that implement the functionality of the original user request.

In step 307, the security gateway 117 receives the translated instructions from the first tunneling driver 220, determines that these instructions satisfy the security requirements of the gateway 117, and pass the instructions to the server side of the embodiment's infrastructure.

In embodiments described here that comprise translating the instructions into standard Web-service requests, the security gateway 117 may forward the translated instructions based on the gateway's support for such Web services. If, for example, the Web-service requests are configured into an application-independent and database-independent protocol or format like SOAP, a SOAP-compliant gateway 117 will be able to determine the contents and requested functionality of the service requests. In such a case, if the request has sufficient priority or security level, the gateway 117 will be able to reliably determine that the requests should be permitted through the gateway.

In other embodiments, step 307 may comprise analogous or similar procedures, so long as the first tunneling driver 220 in step 303 translates the original user request into a standard application-neutral format that may be understood by a standardized security gateway 117.

In step 309, the translated request, after passing through security gateway 117, is received by a software entity 230, which transforms the requested actions into a standardized form that may be understood by the information repository 119. This standardized form is similar to the form of the original database-driver instructions received by first tunneling driver 210 in step 301.

In step 311, these standardized requests are received and implemented by the repository 119 as though they had been received directly from the first database driver 210 in step 301.

The procedure of steps 301-311 may be illustrated by a concrete example in which software entity 230 comprises a Web services runtime environment that supports Web services specifically designed to implement operations intrinsic to the information repository 119.

In this example, these Web services may be requested by a first tunneling driver 220 implemented by means of Java code, that translates instructions received from database driver 210 as service calls to an Apache Tomcat application server. In other embodiments, this step may be implemented by any programming or communications means, known to those skilled in the art, that is capable of emulating operations performed by a standard database driver.

In the current example, a Java-based tunneling driver 220 may define several new Java classes that each correspond to a class of database operations. Such classes may, for example, comprise:

a Driver class that implements a Driver interface, which supports driver operations that allow a user to identify and access database or repository 119;

a Connection class that implements a Connection interface for opening and maintaining a logical connection to a database server;

a Statement class that implements functions of a Statement interface for standardizing database queries to a common convention, such as Structured Query Language (SQL);

a ResultSet class, which implements functions of a ResultSet Interface that allows a user to receive and access results of a database query or other information-access operation.

Here, the tunneling driver 220 would define these classes and generate Web-service requests based on objects of these classes. The Web services runtime environment 230 would also understand these classes and would satisfy the driver's Web-service requests in step 309.

In this example, if a user attempted to query a database 119, the database driver 210 might translate that query into a standard SQL-language query in step 301, the first tunneling driver 220 in step 303 would translate the SQL query into a set of Web-service requests based on objects of the Statement class and structured into a SOAP-compliant format, and in step 305 would pass these service requests to security gateway 117. Because the gateway 117 is able to interpret standardized SOAP messages, it would not block the service requests and would instead forward them to a Web-services runtime environment 230, which would implement the requested query identified by the service requests.

In some embodiments, this implementing might comprise generating instructions in database-specific language that are then forwarded to a second tunneling driver 240 or to a second database driver connected to the information repository 119.

In other embodiments, the Web services runtime environment may perform the requested database services itself, generating database instructions similar to those that would be forwarded by a standardized database driver to the repository 119. In either case, the satisfaction of the Web-service requests in step 309 results in the repository 119 receiving instructions it would have received directly from the first database driver 219 in an unsecured environment where no security gateway 117 is present.

Steps 313-319 manage return communications from repository 119 to the user by means of a procedure analogous to that of steps 301-311.

In step 313, a second tunneling driver receives a response or other message from the information repository. This received data may be data retrieved in response to a query, a diagnostic message, or any other information that may be transmitted from an information repository to a user or to a client application.

As before, the second tunneling driver translates the received data into a form that may be passed through the security gateway 117, or that may be interpreted by a software entity 230 prior to passing through the gateway 117.

In general, a Web service comprises two components, a message and a response. In embodiments of the present invention, the second tunneling driver translates the received data into a form of a Web-service response, wherein the Web-service response may have been comprised by a Web-service requested by the first tunneling driver in step 303.

In step 315, the translated information passes through the security gateway 117 intact. As in step 307, the passed information is in a form that is understood by gateway 117 to comprise trusted operations not specific to any particular information repository or database application.

In step 317, the first tunneling driver 220, reversing the operation of step 303, translates the passed information into a form that, if not for security gateway 117, would have been received by a database driver directly from the information repository's interface or data-management application.

In some embodiments, the first tunneling driver 220 may instead, in this step, translate the passed information into a form that, if not for security gateway 117, would have been received by the user's client application directly from the information repository's standardized database driver.

In step 319, if the first tunneling driver 220 or the first standardized database driver 210 has not already done so, driver 210 or 220 returns properly formatted instructions, data, or other information to the user's client application. To the user, it appears that the client application has communicated directly with the information repository.

The entire method of FIG. 3 may be further illustrated by one final example, in which a user's client application attempts to open a connection to a database server 119 and then submits a query to the server 119. For purposes of this example, the present invention is implemented in an embodiment that comprises the Java classes and Web-services runtime environment described above.

Here, the client application first calls a standardized database driver function that opens a connection to the database server. After a successful performance of this function, the application would expect to receive a Java Connection object identifying the database connection.

In this example, however, the first tunneling driver 220 instead captures the function request, translating it into a Java Connection Web-service request formatted into a SOAP-compliant form that passes intact through gateway 117. On the server side of gateway 117, a Web-services runtime environment 230 receives and serves the connection request and either instructs the repository's local standardized database driver to open the connection, or instructs the second tunneling driver 240 to open the connection. In another variation, the Web-services runtime environment many be embedded within or tightly coupled to the second tunneling driver 240 and may itself directly instruct the database-management application 119 to open the new connection.

The repository's database-management application, upon opening the new connection, returns a Java Connection object to its standardize driver, expecting that the object will be forwarded to the client application, indicating that the connection was successfully opened. In this example, though, it might not be possible to pass that Connection object across the gateway 117 formatted as a Web-service request because Web services, in general, cannot transfer complex entities.

Embodiments of the present invention may resolve this issue by passing across gateway 117 an internal identifier or address of the Java Connection object, rather than the object itself. In response to receiving the identifier or address on the client side of gateway 117, the first tunneling driver 220 creates a dummy Java Connection object, associates the dummy object with the received identifier, and returns the dummy object to the client application.

Because the client application cannot determine that the received object is a dummy identifier, the client application will continue to use that faux received object as a bona fide Java Connection object during subsequent calls to the repository database-management application. During such calls, the tunneling drivers 220 and 240 will seamlessly translate the dummy identifier into the true Java Connection object on either side of the gateway. In this way, the actual complex Java object is never required to be passed across the gateway 117.

The exemplary architecture and accompanying examples, of FIG. 3 include a software entity 230 (in the above examples, a Web services runtime environment) on only the server side of the security gateway 117. But other embodiments of the present invention may comprise an architecture in which the software entity 230 is instead on the client side of gateway 117, positioned between the gateway 117 and the first tunneling driver 220. Yet other embodiments may identify a symmetric architecture, in which analogous software entities 230 exist on both sides of gateway 117. In still other cases, a first software entity 230 on one side of gateway 117 may be invoked for user-database transactions that proceed in one direction, and a second software entity 230 on the other side of gateway 117 may be invoked for user-database transactions that proceed in an other direction.

Regardless of the configuration, the overall functionality and technical advantages of the present invention remain the same. The exact path of translation from standard database instructions to Web-service requests and back may be performed in discrete steps by multiple modules or by a smaller number integrated modules. And, depending upon implementation details, these modules may be positioned on either side of the gateway, so long as the positioning ensures that the gateway sees only standard-format instructions that it can properly interpret.

In step 315, assuming the architecture shown in FIG. 2, the Web-service server or other software entity 230 on the server side of gateway 117 translates the output of the second tunneling driver 240 into a form that may be passed across security gateway 117.

In other embodiments, in which a software entity 230 is located on the client side of gateway 117, components of steps 313-319 may be performed in a different order. Here, the second tunneling driver 240 may forward its service requests directly to the security gateway 117, which recognizes the requests as conforming to a standard Web-service protocol (such as SOAP) and passes them intact to the client side. There, the client-side software entity 230 (such as a Tomcat Web-services runtime environment) satisfies the service requests, thereby implementing operations equivalent to those that would have been specified by an original standardized database driver. In other variations, the client-side software entity 230 might produce a set of instructions to the first tunneling driver 220 or to the first database driver 210.

Regardless of how the functionality of steps 313-319 is divided among software modules, the overall inventive concept and technical advantages of the embodied invention remain the same. Standardized database instructions that would not normally be permitted to pass through a security mechanism 117 are translated by custom drivers into equivalent, gateway-friendly service requests that may be passed intact through the gateway. These service requests, when implemented or communicated to the target database client or server application then perform the requested operations as though the original database instructions had passed through gateway 117 intact.

What is claimed is:

1. A tunneling database security system comprising one or more processors, a memory coupled to each of the one or more processors, a computer-readable hardware storage device coupled to the one or more processors, a complementary pair of tunneling drivers, and a security gateway device configured to interface with the tunneling drivers, said storage device containing program code configured to be run by the one or more processors via the memory to implement a method for a transparent tunneling architecture for a secured database, the method comprising:
   a first tunneling driver of the complementary pair receiving a database-access request from a user application, wherein the user application and the database communicate through the security gateway, and wherein the security gateway allows only authorized communication with the database;
   the first tunneling driver translating the database-access request into a first request for Web services,
      wherein the first request for Web services is in a form authorized for forwarding by the security gateway to a Web services runtime environment,
      wherein the Web services runtime environment is configured to respond to a receipt of the first request by generating and sending output to the second tunneling driver of the complementary pair,
      wherein the output is not restricted from passing through the security gateway in order to reach the second tunneling driver,
      wherein a functionality of the Web services requested by the first request comprises a functionality of the requested database access; and
   wherein the second tunneling driver is configured to, in response to receiving the generated output, communicate to the database instructions identical to those of the access request.

2. The system of claim 1, further comprising:
   the second tunneling driver of the complementary pair receiving a database response from the database, wherein the database response is a function of a communicating the identical instructions to the database;
   the second tunneling driver translating the database response into a Web-service response, wherein the Web-service response is comprised by the Web service that was requested by the first tunneling driver,
      wherein the Web-service response is in a form authorized for forwarding by the security gateway to the Web services runtime environment,
      wherein the Web services runtime environment is further configured to respond to a receipt of the Web-service response by sending a message to the first tunneling driver,
      wherein the message does not have to pass through the security gateway in order to reach the first tunneling driver, and
      wherein a functionality of the Web services requested by the Web-service response comprises a functionality of the database response; and
   wherein the first tunneling driver is configured to, in response to receiving the message, communicate to the user application information identical to that of the database response.

3. The system of claim 1, wherein the functionality of the Web services requested by the first request comprises at least one object of a Java class, wherein the Java class is selected from a group comprising:
   a Driver class that supports functions related to identifying and accessing a database,
   a Connection class that supports functions for opening and maintaining a logical connection to a database, a Statement class that supports functions for configuring a database query into a standard format, and a ResultSet class that supports functions for receiving and accessing a database's response to a request for stored data.

4. The system of claim 1, wherein the database-access request and the generated output are formatted in Structured Query Language (SQL).

5. The system of claim 1, wherein the first request for Web services and the Web-service response for Web services are formatted in Extensible Markup Language (XML).

6. The system of claim 1, wherein the first tunneling driver communicates with the user application through a first intermediate database driver, and wherein the first intermediate database driver is a standardized driver associated with the user application and with the database.

7. The system of claim 1, wherein the second tunneling driver communicates with the database through a second intermediate database driver, and wherein the second intermediate database driver is a standardized driver associated with the database.

8. A method for a tunneling database security system comprising a security gateway device configured to interface with a complementary pair of tunneling drivers, the method comprising:

a first tunneling driver of a complementary pair of tunneling drivers receiving a database-access request from a user application, wherein the user application and the database communicate through the security gateway and wherein the gateway allows only authorized communication with the database;

the first tunneling driver translating the database-access request into a first request for Web services, wherein the first request for Web services is in a form authorized for forwarding by the security gateway to a Web services runtime environment, wherein the Web services runtime environment is configured to respond to a receipt of the first request by generating and sending output to the second tunneling driver of the complementary pair, wherein the output is not restricted from passing through the security gateway in order to reach the second tunneling driver, wherein a functionality of the Web services requested by the first request comprises a functionality of the requested database access; and wherein the second tunneling driver is configured to, in response to receiving the generated output, communicate to the database instructions identical to those of the access request.

9. The method of claim 8, further comprising:

the second tunneling driver of the complementary pair receiving a database response from the database, wherein the database response is a function of a communicating the identical instructions to the database;

the second tunneling driver translating the database response into a Web-service response, wherein the Web-service response is comprised by the Web service that was requested by the first tunneling driver, wherein the Web-service response is in a form authorized for forwarding by the security gateway to the Web services runtime environment, wherein the Web services runtime environment is further configured to respond to a receipt of the Web-service response by sending a message to the first tunneling driver, wherein the message does not have to pass through the security gateway in order to reach the first tunneling driver, and wherein a functionality of the Web services requested by the Web-service response comprises a functionality of the database response; and wherein the first tunneling driver is configured to, in response to receiving the message, communicate to the user application information identical to that of the database response.

10. The method of claim 8, wherein the functionality of the Web services requested by the first request comprises at least one object of a Java class, wherein the Java class is selected from a group comprising:

a Driver class that supports functions related to identifying and accessing a database, a Connection class that supports functions for opening and maintaining a logical connection to a database, a Statement class that supports functions for configuring a database query into a standard format, and a ResultSet class that supports functions for receiving and accessing a database's response to a request for stored data.

11. The method of claim 8, wherein the database-access request and the generated output are formatted in Structured Query Language (SQL).

12. The method of claim 8, wherein the first request for Web services and the Web-service response for Web services are formatted in Extensible Markup Language (XML).

13. The method of claim 8, wherein the first tunneling driver communicates with the user application through a first intermediate database driver, and wherein the first intermediate database driver is a standardized driver associated with the user application and with the database.

14. The method of claim 8, wherein the second tunneling driver communicates with the database through a second intermediate database driver, and wherein the second intermediate database driver is a standardized driver associated with the database.

15. The method of claim 8, further comprising providing at least one support service for at least one of creating, integrating, hosting, maintaining, and deploying computer-readable program code in the computer system, wherein the computer-readable program code in combination with the computer system is configured to implement the receiving, and translating.

16. A computer program product, comprising a computer-readable hardware storage device having a computer-readable program code stored therein, said program code configured to be executed by a processor of a computer system to implement a method for a transparent tunneling architecture for a tunneling database security system, the method comprising:

a first tunneling driver of the complementary pair receiving a database-access request from a user application, wherein the user application and the database communicate through a security gateway configured to interface with the tunneling drivers, and wherein the gateway allows only authorized communication with the database;

the first tunneling driver translating the database-access request into a first request for Web services, wherein the first request for Web services is in a form authorized for forwarding by the security gateway to a Web services runtime environment, wherein the Web services runtime environment is configured to respond to a receipt of the first request by generating and sending output to the second tunneling driver of the complementary pair,
wherein the output is not restricted from passing through the security gateway in order to reach the second tunneling driver,
wherein a functionality of the Web services requested by the first request comprises a functionality of the requested database access; and
wherein the second tunneling driver is configured to, in response to receiving the generated output, communicate to the database instructions identical to those of the access request.

17. The computer program product of claim 16, further comprising:
the second tunneling driver of the complementary pair receiving a database response from the database, wherein the database response is a function of a communicating the identical instructions to the database;
the second tunneling driver translating the database response into a Web-service response, wherein the Web-service response is comprised by the Web service that was requested by the first tunneling driver,
wherein the Web-service response is in a form authorized for forwarding by the security gateway to the Web services runtime environment,
wherein the Web services runtime environment is further configured to respond to a receipt of the Web-service response by sending a message to the first tunneling driver,
wherein the message does not have to pass through the security gateway in order to reach the first tunneling driver, and
wherein a functionality of the Web services requested by the Web-service response comprises a functionality of the database response; and
wherein the first tunneling driver is configured to, in response to receiving the message, communicate to the user application information identical to that of the database response.

18. The computer program product of claim 16, wherein the functionality of the Web services requested by the first request comprises at least one object of a Java class, wherein the Java class is selected from a group comprising:
a Driver class that supports functions related to identifying and accessing a database,
a Connection class that supports functions for opening and maintaining a logical connection to a database,
a Statement class that supports functions for configuring a database query into a standard format, and
a ResultSet class that supports functions for receiving and accessing a database's response to a request for stored data.

19. The computer program product of claim 16, wherein the database-access request and the generated output are formatted in Structured Query Language (SQL), and wherein the first request for Web services and the Web-service response for Web services are formatted in Extensible Markup Language (XML).

20. The computer program product of claim 16, wherein the first tunneling driver communicates with the user application through a first intermediate database driver, wherein the first intermediate database driver is a standardized driver associated with the user application and with the database, and wherein the second tunneling driver communicates with the database through a second intermediate database driver, wherein the second intermediate database driver is a standardized driver associated with the database.

\* \* \* \* \*